United States Patent [19]

Morishita

[11] Patent Number: 5,000,278

[45] Date of Patent: Mar. 19, 1991

[54] MOTORIZED POWER STEERING APPARATUS

[75] Inventor: Mitsuharu Morishita, Himeji, Japan

[73] Assignee: Mitsubishi Denki Kabushiki Kaisha, Tokyo, Japan

[21] Appl. No.: 408,333

[22] Filed: Sep. 18, 1989

[30] Foreign Application Priority Data

Sep. 26, 1988 [JP] Japan .............................. 63-242016

[51] Int. Cl.$^5$ .............................................. B62D 5/04
[52] U.S. Cl. ..................................... 180/79.1; 388/831
[58] Field of Search ....................... 180/79.1; 318/599; 388/804, 811, 819, 829, 831

[56] References Cited

U.S. PATENT DOCUMENTS

| 4,437,531 | 3/1984 | Urabe | 180/79.1 |
| 4,574,903 | 3/1986 | Hashimoto et al. | 180/79.1 |
| 4,660,671 | 4/1987 | Behr et al. | 180/79.1 |
| 4,666,010 | 5/1987 | Morishita et al. | 180/79.1 |

FOREIGN PATENT DOCUMENTS

| 255269 | 11/1987 | Japan | 180/79.1 |
| 255270 | 11/1987 | Japan | 180/79.1 |
| 255272 | 11/1987 | Japan | 180/79.1 |
| 132470 | 5/1989 | Japan | 180/79.1 |
| 186468 | 7/1989 | Japan | 180/79.1 |

Primary Examiner—Mitchell J. Hill
Attorney, Agent, or Firm—Sughrue, Mion, Zinn, Macpeak and Seas

[57] ABSTRACT

A motorized power steering apparatus for a vehicle has a torque sensor which generates an output voltage proportional to a steering torque exerted by the driver of the vehicle. A motor controller controls the output torque of a motor which generates an auxiliary steering force corresponding to the output voltage of the torque sensor. A current limiter limits the motor current to a value which decreases as the engine rotational speed or the vehicle speed increases.

8 Claims, 4 Drawing Sheets

MOTORIZED POWER STEERING APPARATUS

BACKGROUND OF THE INVENTION

This invention relates to a motorized power steering apparatus for automobiles or other vehicles. In the past, power steering apparatuses for automobiles were usually driven by hydraulic power generated by a pump. However, as hydraulic systems are bulky and heavy, in recent years, there has been a trend towards the use of electric motors to provide the drive force for power steering. A power steering apparatus which employs an electric motor to generate an auxiliary torque to assist the steering of the vehicle is referred to as a motorized power steering apparatus.

In a motorized power steering apparatus, a torque sensor measures the steering torque applied by the driver to a steering wheel. An electric motor which is connected to a suitable portion of the steering gear is then controlled in accordance with the measured torque to impart a auxiliary steering force to the steering gear. The auxiliary steering force lessens the force which need by applied to the steering wheel by the driver.

Generally, as the speed of a vehicle increases, the resistance between the road surface and the tires decreases, so the force required for steering the vehicle also decreases. If the auxiliary steering force which is generated by the electric motor were the same at high and low speeds, the resistance to steering felt by the driver would become too light at high speeds. If the driver exerted a sudden torque on the steering wheel at a high vehicle speed, the wheels of the vehicle could turn too sharply, possibly upsetting the stability of the vehicle.

Therefore, in a motorized power steering apparatus, the electric motor is controlled so that the torque which it outputs in response to a given steering torque is lower at high vehicle speeds than at low vehicle speeds. In many conventional power steering apparatuses, the motor is controlled by a microcomputer equipped with an internal memory in which is stored a table of data relating the motor output to the steering torque for all vehicle speeds. When the microcomputer receives signals indicating the vehicle speed and the steering torque applied by the driver, based on the data in the memory, it calculates the appropriate amount of torque to be generated by the motor and controls the motor current accordingly.

In order to perform fine, continuous control of the electric motor over the entire speed range of the vehicle, a large amount of data is necessary. The internal memory of the microcomputer must have a large capacity to accommodate all the data, and it therefore tends to be expensive. Taking everything into consideration, conventional motorized power steering apparatuses which employ a microcomputer are complicated, unreliable, and costly.

SUMMARY OF THE INVENTION

It is an object of the present invention to provide a motorized power steering apparatus which can perform fine control of the auxiliary steering force which it generates without employing a microcomputer.

It is another object of the present invention to provide a motorized power steering apparatus which is reliable, simple in structure, and inexpensive.

A motorized power steering apparatus for a vehicle in accordance with the present invention has a torque sensor for generating an output voltage indicative of the steering torque exerted by a driver of the vehicle. The output torque of a motor for generating an auxiliary steering force on the steering gear of the vehicle is controlled by a motor controller in accordance with the output voltage of the torque sensor. A current limiter limits the current flowing through the motor to a current limit which decreases as the engine rotational speed or the vehicle speed increases. By decreasing the maximum current which can flow through the motor as the engine speed or the vehicle speed increases, the motor can be prevented from exerting too great an auxiliary steering force at high vehicle speeds.

In a preferred embodiment, the current limiter includes a speed sensor for sensing the engine speed or the vehicle speed and a reference voltage generator for generating a reference voltage indicative of a current limit corresponding to the present engine speed or vehicle speed as indicated by the current sensor. A current sensor generates an output voltage proportional to the motor current, and a comparator detects whether the current limit has been exceeded by comparing the reference voltage and the output voltage of the current sensor.

In a preferred embodiment, the speed sensor generates a speed signal having a frequency proportional to the engine speed or the vehicle speed, and the reference voltage generator is a frequency-voltage converter which generates an output voltage which decreases as the frequency of the speed signal increases.

The motor controller is not limited to any particular type, but in a preferred embodiment, it is a self-excited pulse width modulation circuit with feedback from the motor. It generates output pulses having a pulse width which is modulated by the output voltage of the torque sensor.

The torque sensor preferably includes a right turn potentiometer which generates an output voltage proportional to the steering torque only when the steering torque is such as to steer the vehicle to the right and a separate left turn potentiometer which generates an output voltage corresponding to the steering torque only when the steering torque is such as to steer the vehicle to the left. The motor controller is responsive to the output of only one of the potentiometers at a single time. The motor controller preferably includes a logic circuit which prevents the motor from operating when both of the potentiometers simultaneously generate an output voltage of above a prescribed level.

In a preferred embodiment, the potentiometers of the torque sensor generate an output voltage which is proportional to both the steering torque and a supply voltage. A voltage supply provides the torque sensor with a positive supply voltage which decreases as the speed of the vehicle increases. As a result, the output voltage of the torque sensor for a given steering torque decreases as the vehicle speed increases, causing a decrease in the motor torque. There are no restrictions on the structure of the voltage supply. In a preferred embodiment, it comprises a vehicle speed sensor which generates a speed signal having a frequency proportional to the vehicle speed and a frequency-voltage converter which generates an output voltage which decreases as the frequency of the speed signal increases.

DESCRIPTION OF THE PREFERRED EMBODIMENTS

Figure 1:
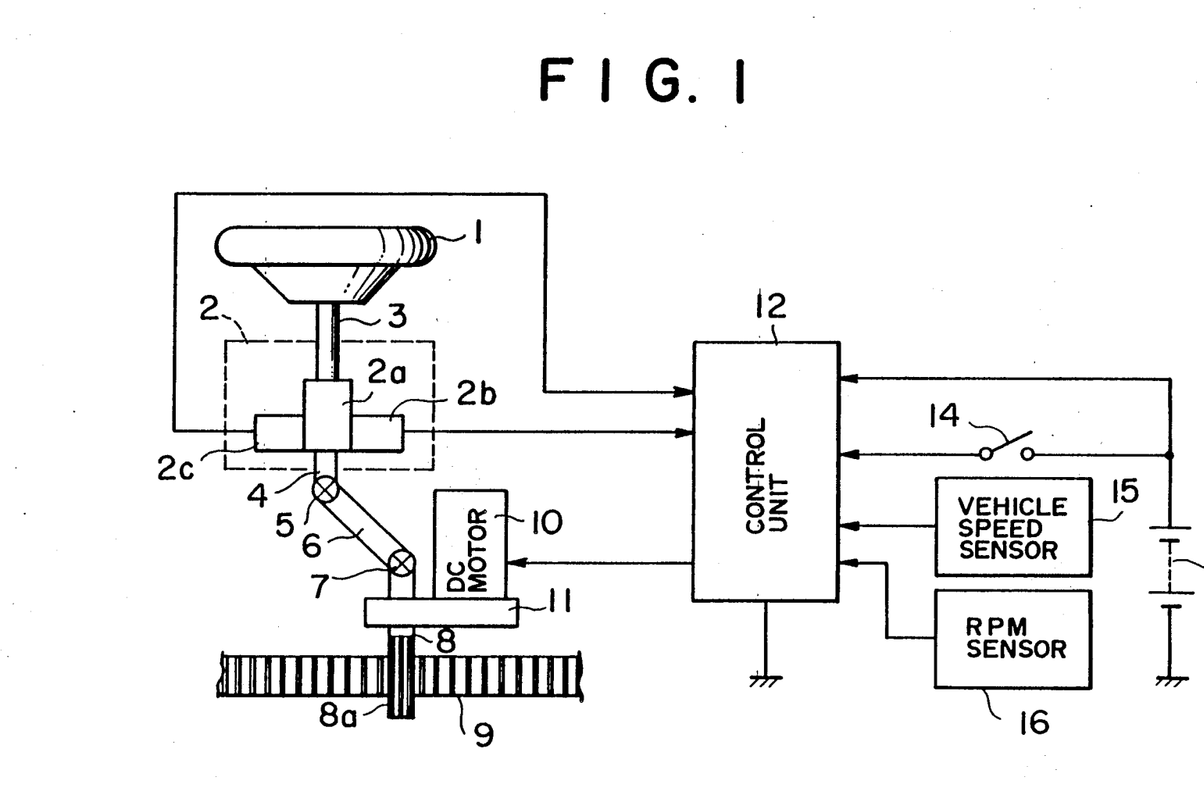
FIG. 1 is a block diagram of an embodiment of a motorized power steering apparatus according to the present invention.

A preferred embodiment of a motorized power steering apparatus according to the present invention will now be described while referring to the accompanying drawings. As shown in FIG. 1, which is a block diagram of this embodiment, a steering wheel 1 of an automotive vehicle is mounted on the upper end of a first steering shaft 3. The lower end of the first steering shaft 3 is connected to the upper end of a second steering shaft 4 by a torque sensor 2. The torque sensor 2 includes a torque-displacement converter 2a which produces a displacement which is proportional to the steering torque applied to the steering wheel 1 by the driver of the vehicle. Any conventional torque-displacement converter can be employed, such as the torque-displacement converter disclosed in U.S. Pat. No. 4,666,010 in which a torsion bar which connects two steering shafts undergoes angular displacement due to twisting which is proportional to the steering torque applied to a steering wheel. The torque sensor 2 also includes a right turn potentiometer 2b and a left turn potentiometer 2c. Each potentiometer has a wiper arm which is moved along a resistive element by the displacement of the torque-displacement converter 2a. The voltage at the wiper arm of each potentiometer constitutes an output voltage of the torque sensor 3 and is provided to a control unit 12 as an indication of the steering torque to the right or to the left, respectively.

The lower end of the second steering shaft 4 is connected to the upper end of a third steering shaft 6 by a first universal joint 5, and the lower end of the third steering shaft 6 is connected to the upper end of a drive shaft 8 by a second universal joint 7. A pinion gear 8a is formed on the lower end of the drive shaft 8. The pinion gear 8a meshes with a rack 9 of the steering gear of the vehicle.

An auxiliary torque can be applied to the drive shaft 8 by an electric motor 10 such as a shunt-wound or permanent magnet DC motor. The motor 10 is connected to the drive shaft 8 by a reduction gear 11 which reduces the rotational speed of the motor 10. The operation of the motor 10 is controlled by the control unit 12, which provides the motor 10 with a pulse width modulated drive signal.

The control unit 12 is powered by the vehicle battery 13, which typically is a 12-volt battery. Portions of the control unit 12 are connected directly to the battery 13, while other portions are connected to the battery 13 via a key switch 14. A vehicle speed sensor 15 generates an output signal having a frequency which is proportional to the vehicle speed. This output signal is supplied to the control unit 12.

Figure 2:
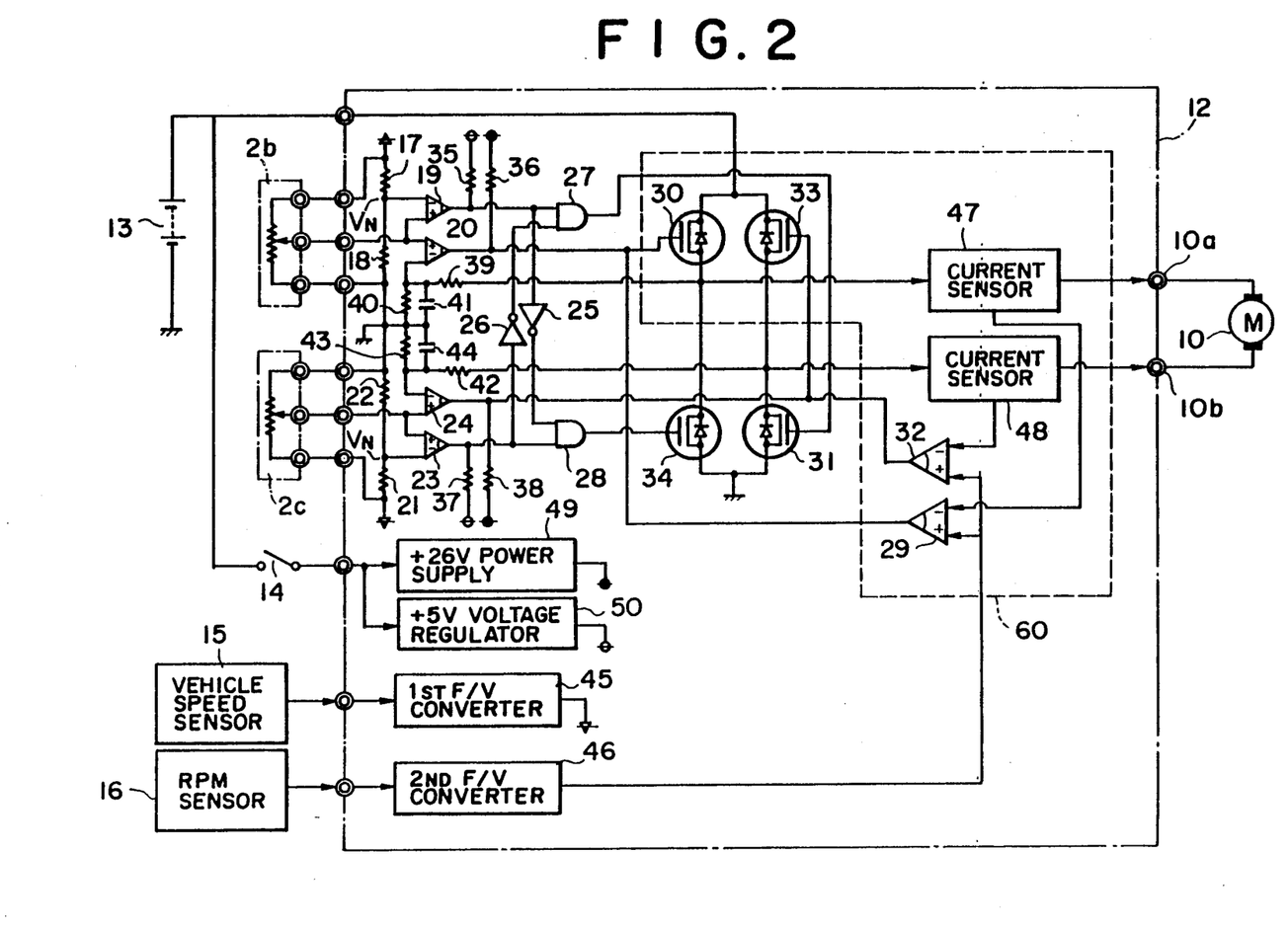
FIG. 2 is a circuit diagram of the control unit of the embodiment of FIG. 1.

FIG. 2 is a circuit diagram of the control unit 12 of FIG. 1, which constitutes a self-excited pulse width modulation circuit with feedback from the motor 10. A first comparator 19 has a positive input terminal which is connected to the wiper arm of the right turn potentiometer 2b and a negative input terminal which is connected to the junction of two series resistors 17 and 18. A second comparator 20 has a positive input terminal which is connected to the wiper arm of the right turn potentiometer 2b and a negative input terminal which is connected to ground through a resistor 40. A third comparator 23 has a positive input terminal which is connected to the wiper arm of the left turn potentiometer 2c and a negative input terminal which is connected to the junction of two series resistors 21 and 22. A fourth comparator 24 has a positive input terminal which is connected to the wiper arm of the left turn potentiometer 2c and a negative input terminal which is grounded through a resistor 43.

Resistors 17 and 18 are connected in series between the output terminal of a first frequency-voltage converter 45 and ground. Resistors 21 and 22 are likewise connected in series between the output terminal of the first frequency-voltage converter 45 and ground. A terminal at one end of the resistive element of each potentiometer 2b and 2c is connected to the output terminal of the first frequency-voltage converter 45, while the terminal at the other end of the resistive element is grounded.

The output terminals of the first comparator 19 and the third comparator 23 are connected to the output terminal of a 5-volt voltage regulator 50 by pull-up resistors 35 and 37, respectively. The output terminals of the second comparator 20 and the fourth comparator 24 are connected to the output terminal of a 26-volt power supply 49 by pull-up resistors 36 and 38, respectively.

The output terminal of the first comparator 19 is also connected to the input terminal of a first inverter 25 and to one of the input terminals of a first AND gate 27. The output terminal of the third comparator 23 is connected to the input terminal of a second inverter 26 and to one of the input terminals of a second AND gate 28. The output terminal of the first inverter 25 is connected to the other input terminal of the second AND gate 28, and the output terminal of the second inverter 26 is connected to the other input terminal of the first AND gate 27.

The electric motor 10 is driven by first through fourth power MOSFET's 30, 31, 33, and 34. The gate of the first MOSFET 30 is connected to the output terminal of the second comparator 20, its drain is connected to the battery 13, and its source is connected to a first terminal 10a of the electric motor 10 via a motor current sensor 47. The gate of the second MOSFET 31 is connected to the output terminal of the first AND gate 27, its drain is connected to a second terminal 10b of the motor 10 via a motor current sensor 48, and its source is grounded. The gate of the third MOSFET 33 is connected to the output terminal of the fourth comparator 24, its drain is connected to the battery 13, and its source is connected to the second terminal 10b of the electric motor 10 via motor current sensor 48. The gate of the fourth MOSFET 34 is connected to the output terminal of the second AND gate 28, its drain is connected to the first terminal 10a of the electric motor 10 via motor current sensor 47, and its source is grounded.

The first terminal 10a of the motor 10 receives a positive input voltage when the motor 10 is being driven so as to steer the wheels of the vehicle for a right turn, and the second terminal 10b receives a positive input voltage during a left turn.

A resistor 39 is connected between the first terminal 10a of the motor 10 and resistor 40, and a capacitor 41 is connected from the junction of resistors 39 and 40 to ground. Similarly, a resistor 42 is connected between the second terminal 10b of the motor 10 and resistor 43, and a capacitor 44 is connected from the junction of resistors 42 and 43 to ground. Capacitors 41 and 43 determine the frequency of self-excited oscillation of the control unit 12. Via resistors 39 and 42, the second and fourth comparators 20 and 24 receive feedback signals from the motor 10.

The power supply 49 and the voltage regulator 50 are connected to the battery 13 by the key switch 14. The above-mentioned first frequency-voltage converter 45 receives the vehicle speed signal which is output by the vehicle speed sensor 15 and generates an output voltage which is inversely proportional to the frequency of the vehicle speed signal. The output voltage of the first frequency-voltage converter 45 is provided to the potentiometers 2b and 2c and resistors 17 and 21 as a positive supply voltage.

An engine rotational speed sensor 16 generates an output signal in the form of an engine speed signal having a frequency proportional to the engine rotational speed. The engine speed signal is provided to a second frequency-voltage converter 46, which generates an output voltage which is inversely proportional to the frequency of the output signal. The output voltage of the second frequency-voltage converter 46 is used as a reference voltage indicating a motor current limit corresponding to the present engine rotational speed. The second frequency-voltage converter 46 therefore constitutes a reference voltage generator. The reference voltage is applied to the positive input terminals of a fifth comparator 29 and a sixth comparator 32. The negative input terminals of comparators 29 and 32 are respectively connected to the output terminals of motor current sensors 47 and 48. Motor current sensor 47 generates a voltage which is proportional to the current flowing through the motor 10 when the vehicle is being steered to the right, and motor current sensor 48 generates a voltage which is proportional to the current flowing through the motor 10 when the vehicle is being steered to the left. The output terminal of the fifth comparator 29 is connected to the output terminal of the second comparator 20 and to the gate of the first MOSFET 30. The output terminal of the sixth comparator 32 is connected to the output terminal of the fourth comparator 24 and the gate of the third MOSFET 33. The first and third MOSFET's 30 and 33, the current sensors 47 and 48, and the fifth and sixth comparators 29 and 32 together constitute a current limiting circuit 60.

Figure 3:
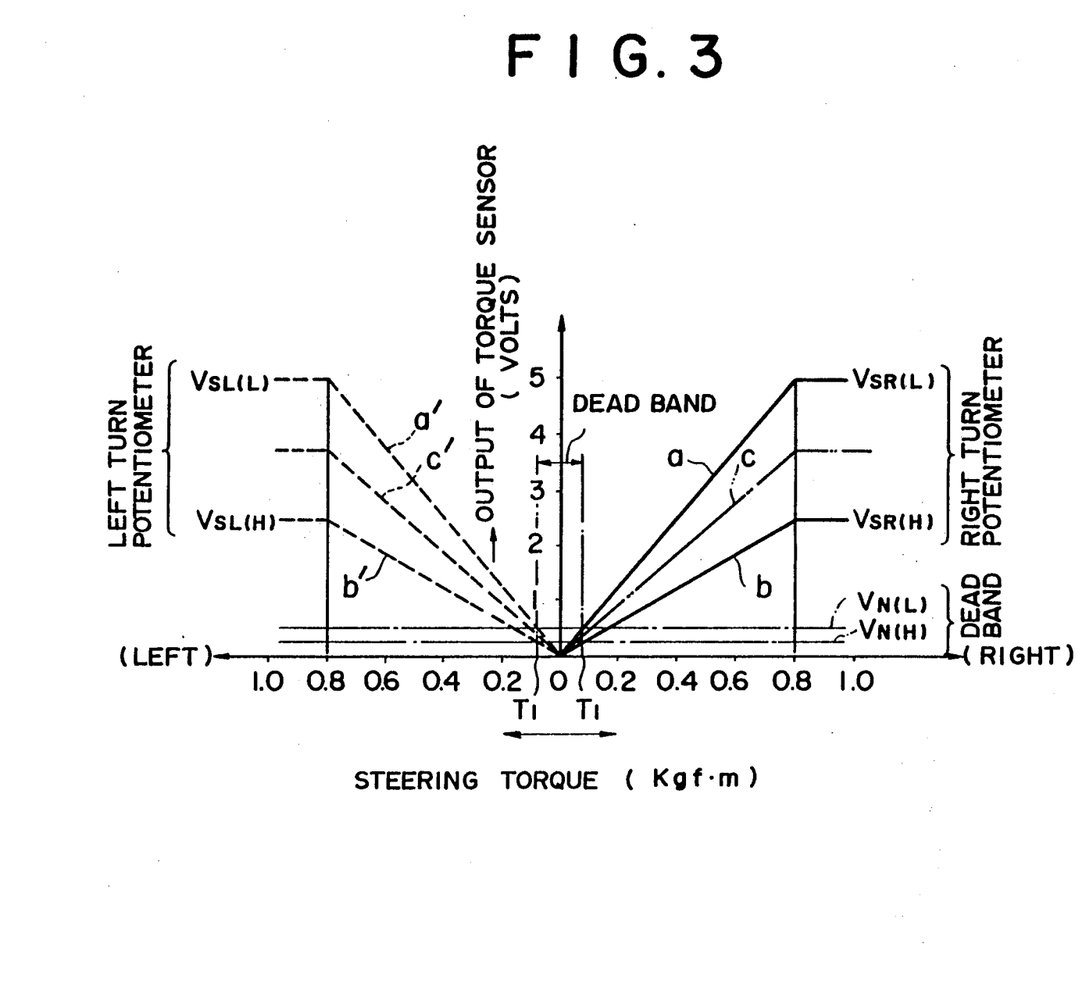
FIG. 3 is a graph showing the output of the torque sensor as a function of the steering torque applied to the steering wheel by the driver of the vehicle.

FIG. 3 illustrates the output characteristics of the torque sensor 2 as a function of the steering torque applied to the steering wheel 1 by the driver. When no steering torque is applied to the steering wheel 1, the output of both potentiometers 2b and 2c is zero volts. When a rightward torque is applied to the steering wheel 1, the output of the right turn potentiometer 2b increases linearly with increasing torque until the steering torque reaches a value of approximately 0.8 kgf-m, at which the output voltage saturates at a voltage $V_{SR}$. When the right turn potentiometer 2b has a non-zero output, the output of the left turn potentiometer 2c remains at zero volts. Conversely, when a leftward steering torque is applied to the steering wheel 1, the output of the right turn potentiometer 2b is zero volts, while the output of the left turn potentiometer 2c increases linearly with increasing steering torque until the steering torque reaches approximately 0.8 kgf-m, upon which the output saturates at a voltage $V_{SL}$. As will be explained below, the levels of $V_{SR}$ and $V_{SL}$ depend upon the vehicle speed.

Figure 4:
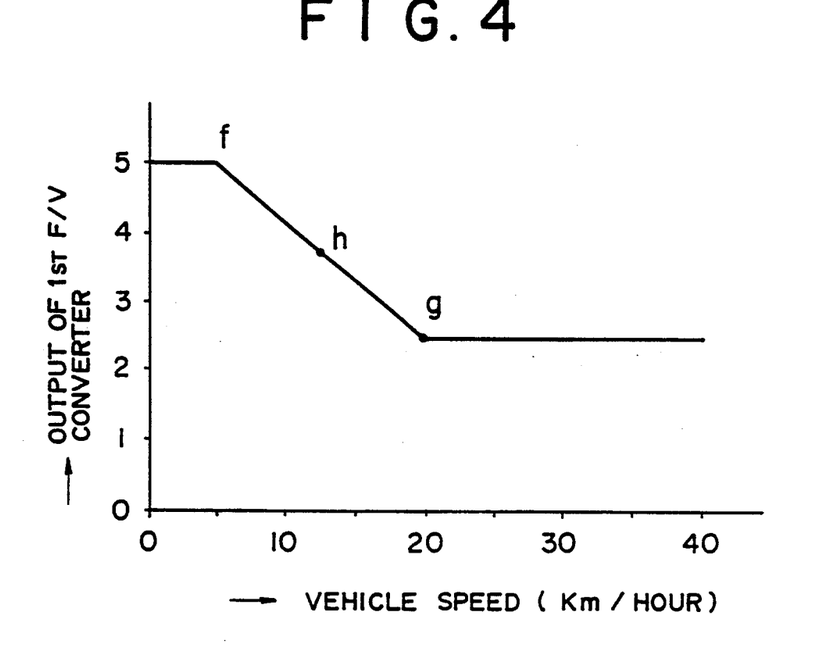
FIG. 4 is a graph of the output of the first frequency-voltage converter as a function of the speed of the vehicle.

FIG. 4 is a graph illustrating the output characteristics of the first frequency-voltage converter 45 as a function of the vehicle speed. At a low vehicle speed of up to approximately 5 km/hr (point f in FIG. 4), the first frequency-voltage converter 45 generates a constant voltage of approximately 5 volts. At a vehicle speed of greater than approximately 20 km/hr (point g), the first frequency-voltage converter 45 generates a constant voltage of approximately 2.5 volts. At a vehicle speed between approximately 5 and 20 km/hr, the output voltage of the first frequency-voltage converter 45 linearly decreases as the vehicle speed increases.

The output voltage of the first frequency-voltage converter 45 is supplied to the potentiometers 2b and 2c as a positive supply voltage. Since the output voltage of the first frequency-voltage converter 45 varies in accordance with vehicle speed, the output characteristics of the torque sensor 2 are also dependent on the vehicle speed. As shown in FIG. 3, when the vehicle speed is below that corresponding to point f of FIG. 4 (approximately 5 km/hr), the output characteristics of the potentiometers 2b and 2c are as shown by curves a and a', respectively, which have a steep slope and a high saturation voltage $V_{SR(L)}$ and $V_{SL(L)}$ of approximately 5 volts. When the vehicle speed is above that corresponding to point g of FIG. 4 (approximately 20 km/hour), the output characteristics of the potentiometers 2b and 2c are shown by curves b and b', respectively, which have a more gradual slope and a lower saturation voltage $V_{SR(H)}$ and $V_{SL(H)}$ of approximately 2.5 volts. When the vehicle speed is between 5 and 20 km/hour, the output characteristics of the potentiometers 2b and 2c are described by curves lying somewhere between curves a and b or a' and b'. For example, when the vehicle speed is that corresponding to point h of FIG. 4 (approximately 12.5 km/hour) midway between points f and g, the output characteristics of the potentiometers 2b and 2c are as shown by curves c and c', respectively, lying midway between curves a and b (or a' and b').

Figure 5:
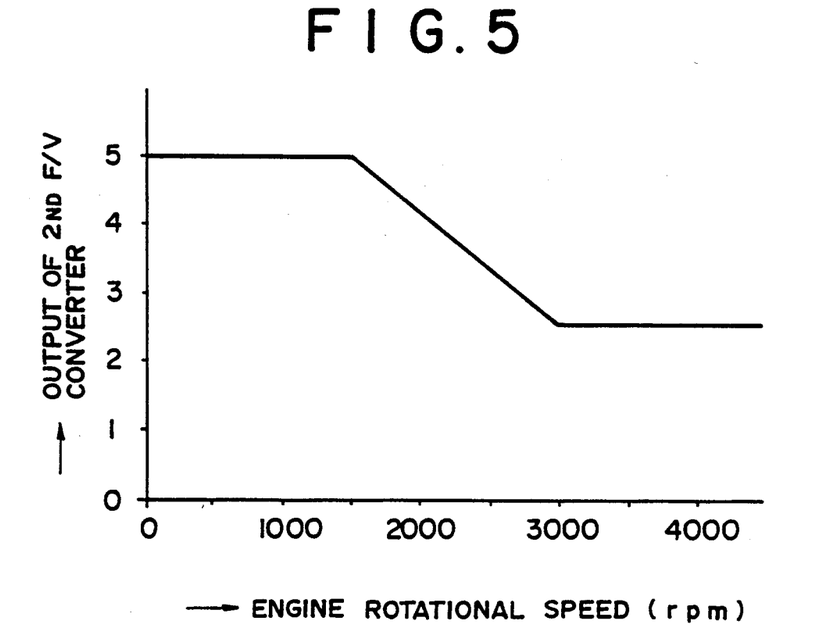
FIG. 5 is a graph of the output of the second frequency-voltage converter as a function of the engine rotational speed.

FIG. 5 shows the output characteristics of the second frequency-voltage converter 46, which are similar to those of the first frequency-voltage converter 45. When the engine rotational speed is less than about 1500 rpm, the output voltage of the second frequency-voltage converter 46 is a constant value of approximately 5 volts. When the engine rotational speed is greater than about 3000 rpm, the output voltage is a constant value of approximately 2.5 volts. Between 1500 rpm and 3000 rpm, the output voltage linearly decreases as the engine rotational speed increases.

When the unillustrated engine of the vehicle is started and the key switch 14 is closed, 12 volts are supplied by the battery 13 to the power supply 49 and the voltage regulator 50, and the control unit 12 begins to operate. It will be assumed that the vehicle is initially stationary, so the vehicle speed sensor 15 generates a signal corresponding to a speed of 0 km/hour. As shown in FIG. 4, the first frequency-voltage converter 45 therefore generates a maximum output voltage of approximately 5 volts. This output voltage is supplied to the potentiometers 2b and 2c and to resistors 17 and 21 as a positive supply voltage. If the driver then applies a steering torque to the steering wheel 1, the torque sensor 2 generates an output voltage corresponding to the magnitude and direction of the steering torque as shown in FIG. 3.

When the driver applies a steering torque to the steering wheel 1 to turn the wheels of the vehicle to the right, the voltage of the wiper arm of the right turn potentiometer 2b is input to the positive input terminals of the first and second comparators 19 and 20. If the output voltage of the right turn potentiometer 2b exceeds the voltage $V_N$ at the junction of resistors 17 and 18, the output of the first comparator 19 goes high. As no voltage has yet been applied to the motor 10, the voltage at the junction of resistors 39 and 40 is low, and the output of the second comparator 20 goes high. The output voltage of the left turn potentiometer 2c is 0 volts, so the outputs of the third and fourth comparators 23 and 24 are low. Therefore, the output of the first inverter 25 is low and the output of the second inverter 26 is high, so the output of the first AND gate 27 is high, the output of the second AND gate 28 is low, and the first and second MOSFET's 30 and 31 are turned on. Therefore, a voltage from the battery 13 is applied to the motor 10 through the first MOSFET 30, and the motor 10 begins to conduct. The positive input voltage for the motor 10, i.e., the voltage at terminal 10a, is also applied across resistors 39 and 40. Therefore, the voltage at the junction of resistors 39 and 40 rises exponentially with a time constant determined by capacitor 41. When the voltage at the junction of resistors 39 and 40 exceeds the voltage at the positive input terminal of the second comparator 20, which is the output voltage of the right turn potentiometer 2b, the output of the first comparator 19 remains high but the output of the second comparator 20 goes low, so the first MOSFET 30 is turned off, and the supply of current to the motor 10 is interrupted. When this interruption takes place, the voltage at the junction of resistors 39 and 40 falls exponentially with a time constant determined by capacitor 41. When the voltage at the junction of resistors 39 and 40 falls below the voltage at the positive input terminal of the second comparator 20, the output of the second comparator 20 again goes high, and the first MOSFET 30 is again turned on to drive the motor 10. In this manner, the second comparator 20 is repeatedly turned on and off, and a series of pulses are supplied to the motor 10 as a supply voltage. A current which is determined by the supply voltage and the counter emf corresponding to the rotational speed of the motor 10 flows through the motor 10. The motor 10 generates an auxiliary torque to turn the wheels of the vehicle to the right, and the steering torque which need be exerted by the driver of the vehicle is reduced. The width of the pulses which are supplied to the motor 10 is dependent on the output voltage of the potentiometer 2b. The greater the output voltage of the potentiometer 2b, the longer is the pulse width.

When the driver exerts a steering torque to turn the vehicle to the left, the third and fourth comparators 23 and 24 are controlled in a manner similar to that described above with respect to the first and second comparators 19 and 20, and a voltage is supplied to the motor 10 to steer the wheels of the vehicle to the left.

As shown in FIG. 3, the output voltage of the potentiometers 2b and 2c corresponding to a given steering torque decreases as the vehicle speed increases. Since the torque generated by the motor 10 decreases as the output voltage of the potentiometers 2b and 2c decreases, it follows that the auxiliary torque generated by the motor 10 in response to a prescribed steering torque decreases as the vehicle speed decreases. This decrease in auxiliary torque compensates for the decrease in the resistance to steering as the vehicle speed increases. Therefore, the feel of the steering wheel remains comfortable without becoming too light at high vehicle speeds, and the safety of the vehicle is maintained.

When the motor 10 conducts, the current sensors 47 and 48 each generate a voltage which is proportional to the current flowing through the motor 10. The output voltages of the current sensors 47 and 48 are compared with the reference voltage which is output from the second frequency-voltage converter 46 by the fifth comparator 29 and the sixth comparator 32, respectively. When the motor 10 is exerting an auxiliary torque for a right turn and the motor current exceeds a prescribed current limit, the output voltage of current sensor 47 will exceed the reference voltage from the second frequency-voltage converter 46, and the output of the fifth comparator 29 will go low. As a result, the first MOSFET 30 will be turned off, and the supply of current to the motor 10 will be stopped. The current flowing through the motor 10 will decrease exponentially with a time constant determined by the inductance and internal resistance of the motor 10. When the current falls below the prescribed current limit, the output voltage of current sensor 47 will fall below the reference voltage from the second frequency-voltage converter 46, so the output of the fifth comparator 29 will again go high. The first MOSFET 30 will again be turned on, and the motor current will again increase. By a repetition of the above operations, the current flowing through the motor 10 is controlled to the prescribed current limit.

When the motor 10 is exerting an auxiliary torque for a left turn, the motor current is controlled by current sensor 48, the sixth comparator 32, and the third MOSFET 33 in a manner similar to that described for a right turn.

As shown in FIG. 5, the output voltage of the second frequency-voltage converter 46 decreases as the engine rotational speed increases. As the current limit for the motor 10 is determined by this output voltage, it follows that the limit current decreases as the engine rotational speed decreases. At a low engine rotational speed, such as when the engine is idling, the current limit is set at a high level, and the motor 10 can exert a large auxiliary torque. At high vehicle speeds, when the engine rotational speed is high, the current limit is reduced to a low level, so the maximum auxiliary torque which the motor 10 can generate is reduced. Therefore, even if the driver of the vehicle exerts a sudden steering torque on the steering wheel 1 at a high vehicle speed, the auxiliary torque which is generated by the motor 10 is limited so as not to cause the wheels of the vehicle to turn too sharply, and the stability of the vehicle can be maintained.

The AND gates 27 and 28 prevent the motor 10 from operating unless the output of either the first comparator 19 or the third comparator 23 is high. This state occurs when the output voltage of the right turn potentiometer 2b exceeds the voltage $V_N$ at the junction of resistors 17 and 18, or when the output voltage of the left turn potentiometer 2c exceeds the voltage $V_N$ at the junction of resistors 21 and 22. If the driver exerts only a very low torque of less than T1 on the steering wheel 1, the outputs of the potentiometers 2b and 2c will not exceed $V_N$, so the motor 10 will not be turned on. Accordingly, there is a dead band of steering torque on either side of a neutral torque in which power steering is not performed. The magnitude of the dead band, i.e., the magnitude of T1, depends on the value of $V_N$ and on the output characteristics of the potentiometers 2b and 2c. In the present embodiment, $V_N$ is a function of the output voltage of the first frequency-voltage converter 45, and so $V_N$ varies with the vehicle speed. As shown in FIG. 3, at a low vehicle speed below that corresponding to point f of FIG. 4, $V_N$ has a maximum value of $V_{N(L)}$, and at a vehicle speed above that corresponding to point g of FIG. 4, it has a minimum value of $V_{N(H)}$. When the vehicle speed is somewhere between that corresponding to points f and g, $V_N$ has a level somewhere between $V_{N(L)}$ and $V_{N(H)}$. Thus, $V_N$ decreases as the vehicle speed increases. However, as $V_N$ decreases, the slopes of the curves defining the output characteristics of the potentiometers also decrease, so T1 and the magnitude of the dead band remain constant at all vehicle speeds.

Normally, only one of the potentiometers generates an output voltage at a time. If the potentiometers should malfunction (due, for example, to noise generated by the torque sensor 3 itself, bad contacts, broken wires, or short circuits) and both generate an output voltage of greater than $V_N$ at the same time, the outputs of both AND gates 27 and 28 will go low and prevent MOSFET'S 31 and 34 from conducting. Therefore, the motor 10 will not be able to operate, and there will be no possibility of the motor 10 exerting an auxiliary torque in a direction opposite to the direction in which the driver wishes to steer the vehicle. Although the steering will feel heavy when the motor 7 does not operate, as the steering wheel 1 is mechanically linked to the rack 9, the driver will still be able to safely steer the vehicle.

In the embodiment illustrated in FIG. 2, the motor current is limited on the basis of the engine rotational speed, and the output of the second frequency-voltage converter 46 is used as a reference voltage indicating the current limit. However, it is instead possible to limit the motor current on the basis of the vehicle speed and to employ the output of the first frequency-voltage converter 45 as a reference voltage indicating the current limit. In this case, the second frequency-voltage converter 46 could be omitted, and the output voltage of the first frequency-voltage converter 45 could be supplied to the positive input terminals of the fifth and sixth comparators 29 and 32.

What is claimed is:

1. A motorized power steering apparatus for a vehicle comprising:

torque sensing means for generating an output voltage proportional to a steering torque exerted by a driver of the vehicle;

a motor for generating an auxiliary steering force proportional to a current flowing through the motor;

motor control means for controlling the output torque of the motor in accordance with the output voltage of the torque sensing means; and current limiting means for limiting the motor current to a current limit which decreases as the rotational speed of the engine increases, wherein the current limiting means comprises:

an engine speed sensor (16) for generating an engine speed signal indicative of the rotational speed of the engine;

reference voltage generating means (46) responsive to the engine speed signal for generating a reference voltage indicative of a current limit inversely corresponding to the engine speed detected by the engine speed sensor;

current sensing means (47,48) for generating an output voltage proportional to the motor current;

detecting means (29,32) for detecting that the motor current exceeds the current limit by comparing the reference voltage and the output voltage of the current sensing means; and means for preventing current from being supplied to the motor when the detecting means detects that the motor current exceeds the current limit.

2. A power steering apparatus as claimed in claim 1, wherein:

the engine speed sensor comprises means for generating an engine speed signal having a frequency proportional to the engine rotational speed; and the reference voltage generating means comprises a frequency-voltage converter which generates a reference voltage which decreases as the frequency of the engine speed signal increases.

3. A motorized power steering apparatus for a vehicle comprising:

torque sensing means for generating an output voltage proportional to a steering torque exerted by a driver of the vehicle;

a motor for generating an auxiliary steering force proportional to a current flowing through the motor;

motor control means for controlling the output torque of the motor in accordance with the output voltage of the torque sensing means; and current limiting means for limiting the motor current to a current limit which decreases as the vehicle speed increases, wherein the current limiting means comprises:

a vehicle speed sensor (15) for generating a vehicle speed signal indicative of the rotational speed of the engine;

reference voltage generating means (45) responsive to the vehicle speed signal for generating a reference voltage indicative of a current limit inversely corresponding to the vehicle speed detected by the vehicle speed sensor;

current sensing means (47,48) for generating an output voltage proportional to the motor current;

detecting means (29,32) for detecting that the motor current exceeds the current limit by comparing the reference voltage and the output voltage of the current sensing means; and means for preventing current from being supplied to the motor when the detecting means detects that the motor current exceeds the current limit.

4. A power steering apparatus as claimed in claim 3, wherein:

the vehicle speed sensor comprises means for generating a vehicle speed signal having a frequency proportional to the vehicle speed; and the reference voltage generating means comprises a frequency-voltage converter which generates a reference voltage which decreases as the frequency of the vehicle speed signal increases.

5. A power steering apparatus as claimed in claim 4, wherein:

the torque sensing means comprises means for generating an output signal which is proportional to a supply voltage and to the steering torque; and the reference voltage from the frequency-voltage converter is supplied to the torque sensing means as the supply voltage.

6. A motorized power steering apparatus for a vehicle comprising:

torque sensing means for generating an output voltage proportional to a supply voltage and a steering torque exerted by a driver of the vehicle;

a motor for generating an auxiliary steering force proportional to a current flowing through the motor;

motor control means for controlling the output torque of the motor in accordance with the output voltage of the torque sensing means;

an engine speed sensor (16) for generating an engine speed signal having a frequency proportional to the rotational speed of the engine;

a first frequency-voltage converter (46) for generating a reference voltage which decreases as the frequency of the engine speed signal increases;

current sensing means (47,48) for generating an output voltage proportional to the motor current;

detecting means (29,32) for detecting that the motor current exceeds the current limit by comparing the reference voltage and the output voltage of the current sensing means;

means for preventing current from being supplied to the motor when the detecting means detect that the motor current exceeds the current limit;

a vehicle speed sensor (15) for generating a vehicle speed signal having a frequency proportional to the vehicle speed; and a second frequency-voltage converter (45) for generating an output voltage which decreases as the frequency of the vehicle speed signal increases and which is supplied to the torque sensing means as the supply voltage.

7. A power steering apparatus as claimed in claim 6, wherein the motor control means comprises a self-excited pulse width modulation circuit with feedback from the motor for supplying the motor with drive pulses having a pulse width which is modulated by the output voltage of the torque sensing means.

8. A power steering apparatus as claimed in claim 7, wherein the pulse width modulation circuit comprises:

a bridge circuit consisting of a plurality of switching elements, the motor being connected across the bridge circuit;

a capacitor and a resistor connected in parallel between the motor and ground; and a comparator having a first input terminal to which the output voltage of the torque sensing means is applied and a second input terminal connected to the junction of the capacitor and the resistor, the output voltage of the comparator being supplied to a gate of one of the switching elements of the bridge circuit.

* * * * *